US012544889B2

(12) United States Patent
Davis et al.

(10) Patent No.: US 12,544,889 B2
(45) Date of Patent: Feb. 10, 2026

(54) SENSOR INSTALLATION TOOL

(71) Applicant: Caterpillar Inc., Peoria, IL (US)

(72) Inventors: Tony Barton Davis, Sumter, SC (US);
William E. McCoy, Sumter, SC (US);
Henry Torosyan, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 306 days.

(21) Appl. No.: 18/125,607

(22) Filed: Mar. 23, 2023

(65) Prior Publication Data
US 2024/0316734 A1 Sep. 26, 2024

(51) Int. Cl.
B25B 27/02 (2006.01)
F15B 19/00 (2006.01)
G01D 11/30 (2006.01)

(52) U.S. Cl.
CPC ............... B25B 27/02 (2013.01); F15B 19/00 (2013.01); G01D 11/30 (2013.01)

(58) Field of Classification Search
CPC .......... B25B 27/02; F15B 19/00; G01D 11/30
See application file for complete search history.

(56) References Cited

U.S. PATENT DOCUMENTS

| 5,182,980 | A | 2/1993 | Greer |
| 7,059,238 | B2 | 6/2006 | Albright et al. |
| 9,482,245 | B2 | 11/2016 | Palmer et al. |
| 2003/0135995 | A1* | 7/2003 | Glasson ................ F15B 15/283 29/832 |
| 2017/0122347 | A1 | 5/2017 | Lemke et al. |

FOREIGN PATENT DOCUMENTS

| CN | 104254754 | 6/2016 |
| EP | 0894983 | 2/1999 |

* cited by examiner

Primary Examiner — Jamel E Williams
(74) Attorney, Agent, or Firm — Schwegman, Lundberg & Woessner

(57) ABSTRACT

A sensor installation tool for installing a sensor in a pocket in a cap end of a hydraulic cylinder may include an elongate portion configured for reaching through a hydraulic cylinder from outside a rod end to a cap end thereof and having a proximal end and a distal end. The tool may also include a delivery head arranged on a distal end and comprising a centering portion and a positioning portion. The centering portion may be configured to engage an inner surface of the hydraulic cylinder to hold the positioning portion in a centered position within the cylinder and the positioning portion may be configured to hold the sensor at the centered position to align the sensor with the pocket and drive the sensor into the pocket.

19 Claims, 11 Drawing Sheets

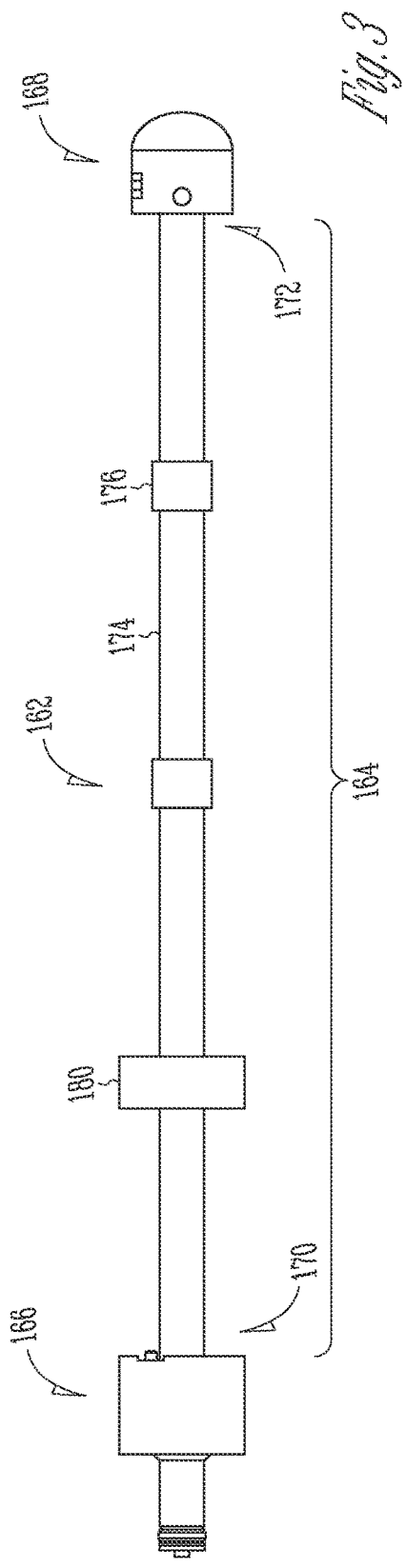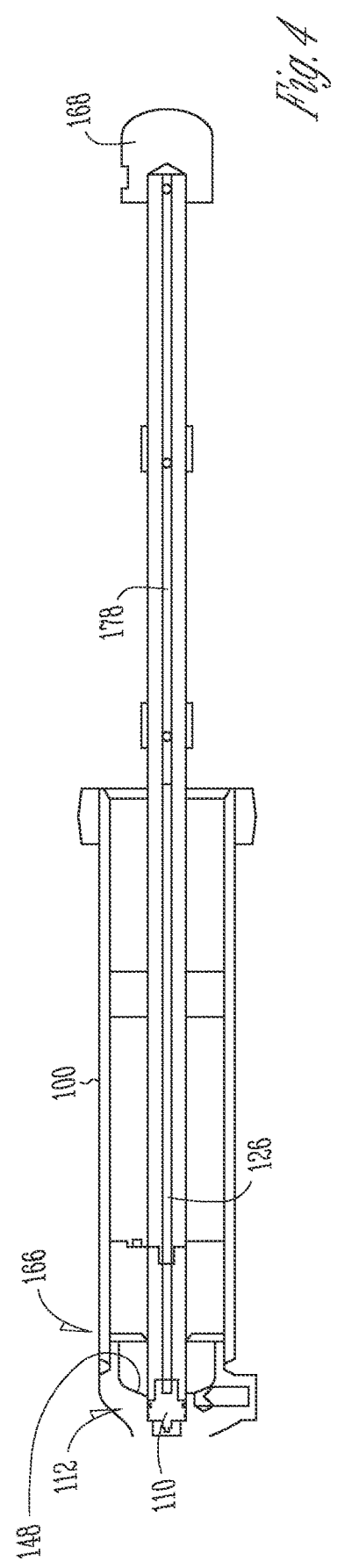

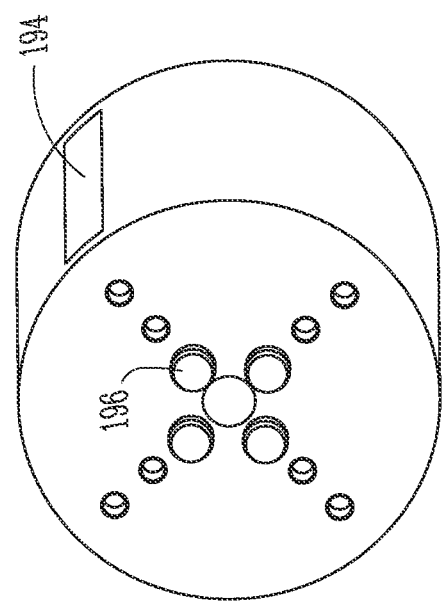
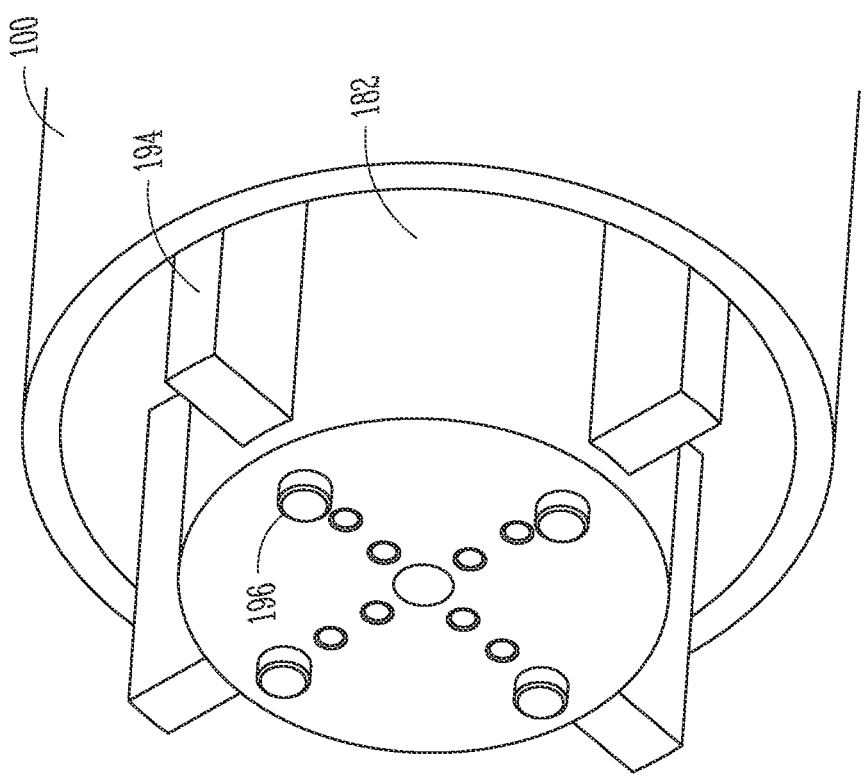

SENSOR INSTALLATION TOOL

TECHNICAL FIELD

The present application relates generally to hydraulic systems such as those used on work machines including excavators, trucks, or other heavy equipment for construction, farm implements, and other machines adapted for performing work. More particularly, the present application relates to devices and methods for installing sensors in hydraulic cylinders of the hydraulic systems. Still more particularly, the present application relates to a tool for installing a position sensor in the cap end of a hydraulic cylinder.

BACKGROUND

Position sensors may be arranged in hydraulic cylinders to monitor the position of the piston within the cylinder and, as such, allow for monitoring the extension and retraction of the piston rod extending out of a rod end of a hydraulic cylinder. During manufacturing of hydraulic cylinders, placement of these sensors can be difficult because the cap end of the hydraulic cylinder may be welded in place prior to placement of the sensor. As such, the sensor may be placed in the cap end of the hydraulic cylinder from the opposite end of the cylinder via an open rod end of the cylinder. The length of the cylinder can be considerable and proper placement of the sensor at an opposite end of a such a long tubular can be difficult.

U.S. Pat. No. 7,059,238 relates to a method and apparatus for a stroke position sensor for a hydraulic cylinder. For installation and removal of the sensor, a wrench socket 70 that has a longitudinally extending slot 72 therein is utilized, and it is attached to a suitable socket drive 74.

SUMMARY

In one or more examples, a sensor installation tool for installing a sensor in a pocket in a cap end of a hydraulic cylinder may include an elongate portion configured for reaching through a hydraulic cylinder from outside a rod end to a cap end thereof and having a proximal end and a distal end. The tool may also include a delivery head arranged on a distal end and comprising a centering portion and a positioning portion. The centering portion may be configured to engage an inner surface of the hydraulic cylinder to hold the positioning portion in a centered position within the cylinder and the positioning portion may be configured to hold the sensor at the centered position to align the sensor with the pocket and drive the sensor into the pocket.

In another example, a method of installing a sensor in a pocket in a cap end of a hydraulic cylinder may include placing a sensor on a positioning portion of a sensor installation tool and inserting the positioning portion with the sensor into a rod end of the hydraulic cylinder including engaging an inner surface of the hydraulic cylinder with a centering portion of the installation tool. The method may also include advancing the sensor through the hydraulic cylinder with the installation tool to a cap end of the hydraulic cylinder and seating the sensor in the pocket by relying on the centering portion for alignment of the sensor with the pocket and advancing the tool.

BRIEF DESCRIPTION OF THE DRAWINGS

FIG. 3 is a side view of a sensor installation tool according to one or more examples.

FIG. 4 is a cross-sectional view of the sensor installation tool in place within a hydraulic cylinder, according to one or more examples.

FIG. 6 is a perspective view of a delivery head or other element having an adjustable diameter, according to one or more examples.

FIG. 7 is a perspective view of the delivery head of FIG. 6 with radial standoffs retracted, according to one or more examples.

DETAILED DESCRIPTION

Figure 1:
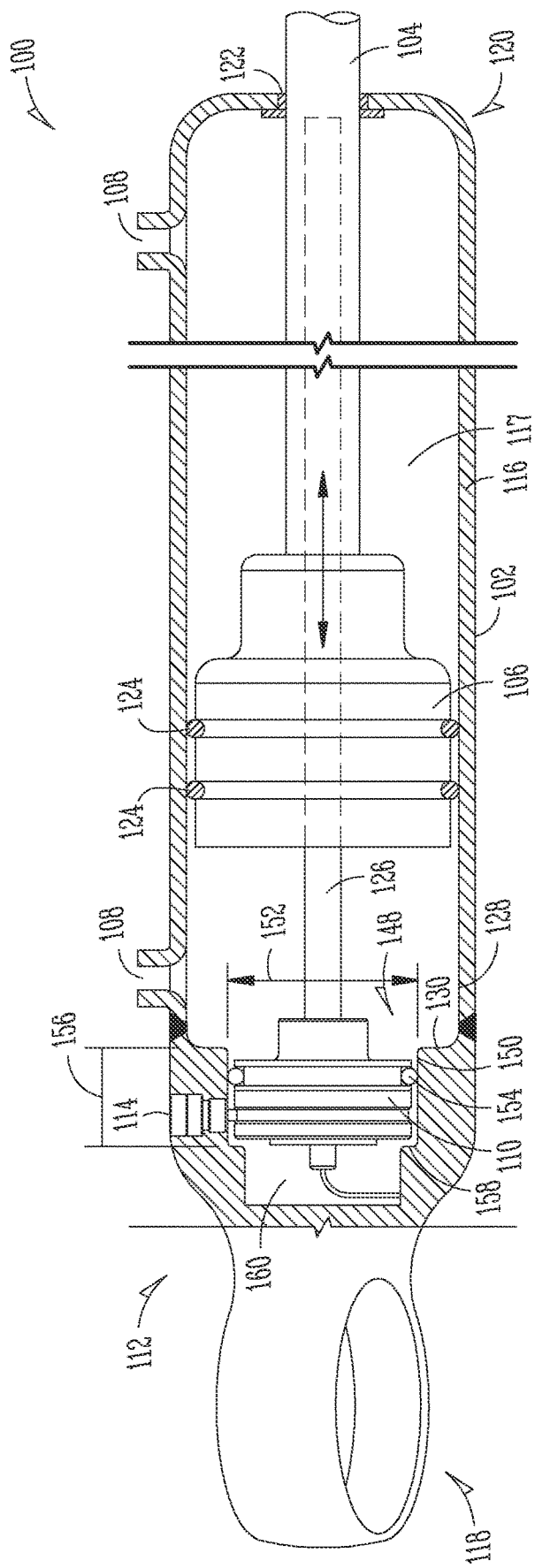
FIG. 1 is partial cut away view of a hydraulic cylinder, according to one or more examples.

FIG. 1 is a perspective and partial breakaway view of a cap end 112 of a hydraulic cylinder 100. The hydraulic cylinder 100 may be configured to extend and retract and may be present on a work machine, for example. Work machines may include excavators, trucks with articulating truck beds, skid steers, or other work machines having hydraulic systems. The hydraulic cylinder 100 may be adapted, for example, to control the position of one or more articulating elements on the work machine.

With continued reference to FIG. 1, the hydraulic cylinder 100 may include a housing 102, a rod 104, a piston 106, and one or more ports 108 for delivering and/or receiving hydraulic fluid from the hydraulic cylinder 100. A sensor 110 may be arranged within the cap end 112 of the cylinder 100.

The housing 102 may be configured to contain and withstand relatively high fluid pressures and guide the piston 106 along a pathway allowing the piston 106 to articulate back and forth through a stroke length based on fluid flow on one more sides of the piston 106. The housing 102 may include a cylinder wall 116 defining a longitudinally extending cylindrical chamber 117. The housing 102 may also include a cap end 112 and a rod end 120. The cap end 112 may be a substantially closed end of the cylinder. A port 108 may be provided near the cap end for introduction and ejection of hydraulic fluid. The cap end 112 may include a cap eye 118 for securing the hydraulic cylinder 100 to the work machine. In one or more embodiments, the cap eye 118 may include an eye for receiving a pin or bolt allowing the hydraulic cylinder 100 to pivot relative to its connection to the work machine or implement of the work machine. The rod end 120 may close off of the end of the cylinder with respect to the piston 106 and the hydraulic fluid, but may include a sealed opening 122 for passing through of the rod 104. Like the cap end 112, a port 108 may be provided near the rod end 120 for introduction and ejection of hydraulic fluid.

The rod 104 may be secured to the piston 106 and may include a longitudinal element having a diameter smaller than the housing 102 and adapted for sleevably articulating within the housing 102 based on articulation of the piston 106. The rod 104 may be secured to the piston 106 at a piston end, may extend through the rod end 120 of the housing 102 to a working end, and may include an eye or other attachment feature (not shown) on the working end. The eye or other attachment feature may allow the rod 104 to be secured to the work machine 100 or an implement of the work machine 100 and the eye may provide for pivoting motion of the connection by way of a pinned or bolted connection, for example.

The piston 106 may be arranged within the housing 102 and may be adapted to articulate through the housing 102 based on fluid flow into and out of the housing 102 on either side of the piston. In one or more examples, the piston 106 may be a cylindrical element having an outer diameter only slightly smaller than the inner diameter of the cylinder wall 116 of the housing 102. One or more seals 124 may be arranged on the piston 106 to provide the sealing engagement with the inner surface of the housing 102. The piston 106 may include a through bore for receiving and engaging the rod 104. For example, the piston 106 may threadably engage the rod 104 and, as such, may include a threaded through bore adapted to threadably secure the piston 106 to the rod 104.

Depending on the nature of the rod/piston connection and whether the rod extends fully through the piston, both the rod and the piston or just the rod may include a bore for receiving a sensing pipe 126 of the sensor 110. The bore may extend deep into the rod 104 in the form of a gun drilled bore. The bore may allow the piston 106 and the rod 104 to sleevably articulate over the sensing pipe 126.

The port or ports 108 of the hydraulic cylinder 100 may be adapted to deliver and receive hydraulic fluid to/from the hydraulic cylinder 100 and may be arranged at opposite ends of the housing 102 (i.e., one at the cap end 112 and one at the rod end 120). The ports 108 may provide for connection of hydraulic fluid lines and may provide the pathway for hydraulic fluid to enter and exit the hydraulic cylinder 100.

The cap end 112 of the cylinder 100 may be adapted for securing the cylinder 100 to the work machine or an implement thereof, containing cylinder pressure. As shown, the cap end 112 may include a bulkhead casting adapted for securing to the housing 102. As shown, the bulkhead casting may be welded to the cylinder wall 116 at a circumferentially extending weld 128. The bulkhead casting may include a piston stop surface 130.

Figure 2:
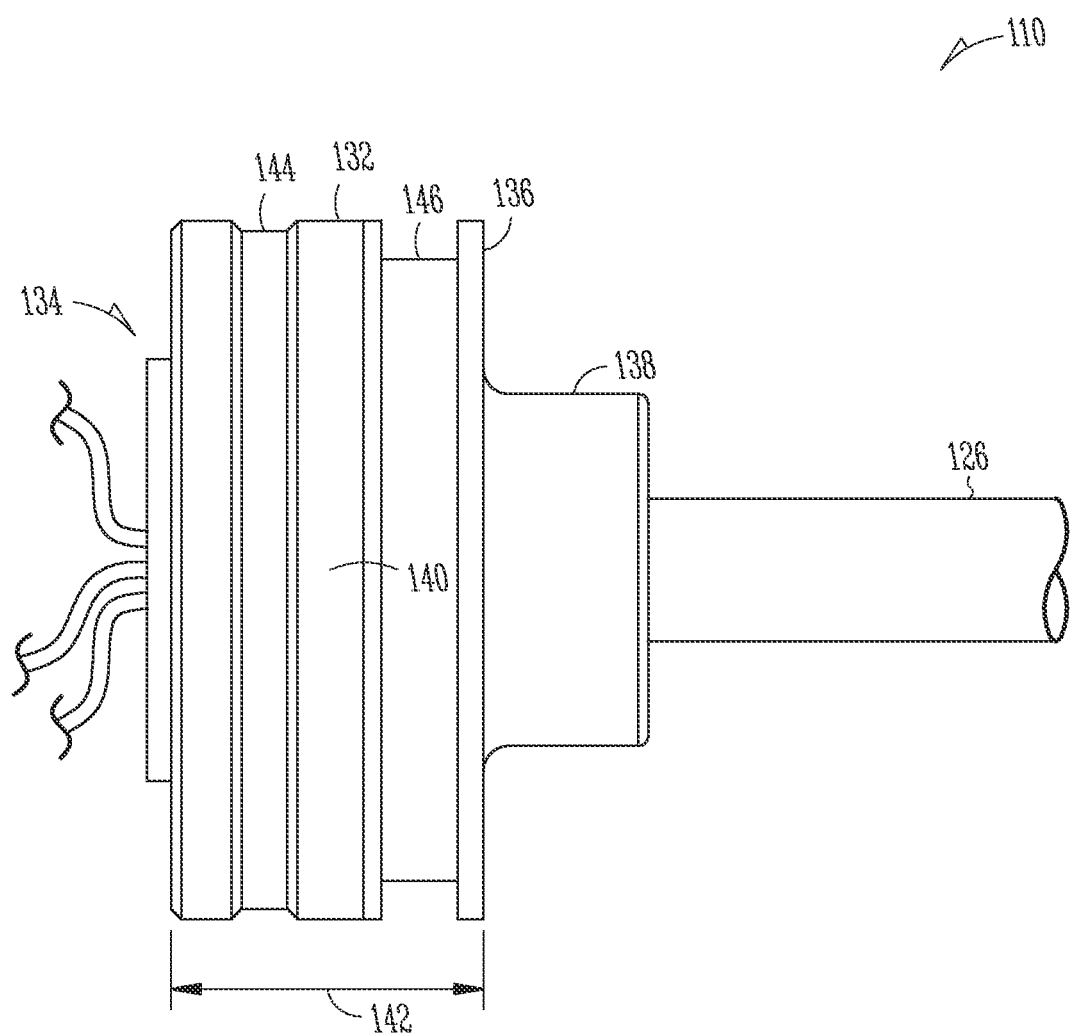
FIG. 2 is a side view of the sensor of the hydraulic cylinder of FIG. 1, according to one or more examples.

Referring to FIG. 2, the sensor 110 may include a puck-shaped housing 132 configured for arrangement in the cap end 112 of the hydraulic cylinder 100. The sensor 110 may also include a sensing pipe 126 extending from the puck-shaped housing 132 and into and along the length of the cylinder 100. The puck-shaped housing 132 may enclose and protect sensor elements that energize the sensing pipe 126 and/or receive information or signals from the sensing pipe 126 relating to the position of the piston 106 and/or the rod 104 along the sensing pipe 126. The puck-shaped housing 132 may include a substantially circular cap side 134 and a substantially circular cylinder side 136. The cylinder side 136 may have the sensing pipe 126 extending therefrom and a collar or other sensing pipe support or collar 138 may be provided. The cap side 134 may include a wire port for passing wires or other communication lines out of the puck-shaped portion 132 of the sensor 110. The peripheral portion of the puck-shaped element 132 may include a substantially cylindrical outer wall 140 with a height 142. The outer wall 140 may include a retention groove 144 and a seal groove 146, each extending peripherally around the cylindrical outer wall 140 of the puck-shaped element 132. The seal groove 146 may be adapted to receive an O-ring, for example, and the retention groove 144 may be adapted for engagement by a set screw, retention pin 114 or other securing mechanism. In one or more examples, the sensor groove and retention pin may be the same or similar to the groove/pin described in U.S. patent application Ser. No. 17/514,745 entitled Hydraulic Cylinder with a Side Load Sensor Retention Pin, filed on Oct. 29, 2021, the content of which is hereby incorporated by reference herein in its entirety.

As may be appreciated from a review of FIG. 1, the articulating motion of the piston 106 and rod 104 within the cylinder housing 102 may occur based on relatively high pressures acting on the piston 106. As such, maintaining the sensor 110 in a protected position and out of the way of the piston/rod motion may be helpful for the longevity of the sensor 110. To this end, the cap end 112 of the cylinder may be adapted for accommodating a sensor 110. That is, the cap end 112 may include a pocket 148 for receiving a sensor 110. As shown, the pocket 148 may include a substantially cylindrically shaped pocket with a cylindrical sidewall 150 for receiving the sensor 110. The pocket 148 may have a lateral width or diameter 152 adapted to receive the sensor 110 with limited tolerance around the sensor 110 such that an O-ring or other seal 154 on the sensor 110 may engage the sidewall 150 and create a seal between the piston/rod chamber 117 of the cylinder 100 and the back side of the sensor 110. The pocket 148 may have a depth for substantially fully seating the puck-shaped portion 132 of the sensor 110 in the pocket 148 to avoid contact with the articulating piston 106. That is, the longitudinal length 156 (e.g., in the direction of longitudinal articulation of the piston) of the sidewall 150 of the pocket 148 may be the same, similar, or slightly larger than the height 142 of the cylindrical outer wall 140 of the puck-shaped element 132. An annular surface or shoulder 158 may be provided at the bottom of the pocket 148 against which the sensor 110 may be seated. The annular surface or shoulder 158 may give way to a cavity 160 behind the pocket 148 for routing of wiring or communication lines from the sensor 110 through and out of the cap end 112 of the cylinder 100.

Referring now to FIG. 3, a tool 162 for assisting with the installation of a sensor 110 such as that shown with respect to FIGS. 1-2 is shown. The tool 162 may be configured for hold a sensor 110 and for insertion of the senor 110 into a rod end 120 of a hydraulic cylinder 100, passing the sensor 110 within the cylinder 100 and along the length of the cylinder 100 to the inside pocket 148 in a cap end of the cylinder 100. It is noted that this process may be performed prior to installation of the piston 106 and the rod 104 and before the rod end is closed off and sealed against the rod 104. The tool 162 may be particularly adapted to perform a centering function so as to align the sensor 110 with the pocket 148 such that the sensor 110 may be safely forced against the resistance of the seal 154 or other frictional forces to engage the sensor 110 in the pocket 148. That is, alignment of the sensor 110 with the pocket 148 before forcing may help prevent damaging the sensor 110. As shown in FIG. 3, the tool 162 may include an elongate portion 164, a delivery head 166 at a distal end 170 of the elongate portion 164, and strike block 168 at a proximal end 172 of the elongate portion 164.

The elongate portion 164 may be configured to fit within a hydraulic cylinder 100, provide reach from outside a rod end 120 of the cylinder to the cap end 112 of the cylinder 100, and transmit a driving force from a proximal end 172 of the elongate portion 164 to a distal end 170 of the elongate portion 164. As shown, the elongate portion 164 may include a rod, tube, pipe, or other elongate element 174 having a distal end 170 and a proximal end 172. The elongate portion may include one or more elongate elements or sections connected end-to-end to allow for adjustability of the length of the elongate portion 164, for collapsibility, for storage, and/or for other purposes. In one or more examples, the end-to-end connections may include couplings 176, one portion may sleevably engage an adjacent portion, or other approaches may be used. In one or more examples, the couplings or sleeved connections 176 may be threaded, spring balls may be used, friction fittings may be provided, internal tension strings or elastic cords may be used, or other techniques for holding the several elements together in end-to-end fashion may be provided.

As shown in FIG. 4, all or a portion of the elongate portion may be hollow to receive the sensor pipe 126 extending from a proximal side of the sensor 110 into the distal end 170 of the elongate portion 164 and through the elongate portion 164 toward a proximal end 172. As mentioned, the sensor pipe 126 may be configured for extending through the piston 106 of the assembled hydraulic cylinder 100 to assist with measuring the location of the piston 106. As such, the sensor pipe 126 may extend through all or a large portion of the hydraulic cylinder 100. Accordingly, a corresponding length of the elongate portion 164 may be hollow or have a bore 178 therein for accommodating the sensor pipe 126. In one or more examples, the full length of the elongate portion 164 may be hollow or have a bore 178 extending longitudinally therethrough.

With continued reference to FIG. 3, the elongate portion 164 may also include one or more lateral alignment spacers 180. The lateral alignment spacer(s) 180 may be configured to control the bowing, sagging, or other lateral motion of the elongate portion 164 along its length. The lateral alignment spacer 180 may take the form, for example, of a bushing that makes up the space between an outside surface of the elongate portion 164 and an inner surface of the hydraulic cylinder 100 to maintain a generally centered position of the elongate portion 164 at the location of the spacer 180. In one or more examples, the lateral alignment spacer 180 may be a generally solid, annularly shaped element with an inner diameter sized to receive the elongate portion 164 and an outer diameter selected to loosely engage an inside surface of the hydraulic cylinder 100. In one or more examples, the spacer 180 may have a length extending along the elongate portion 164 that is the same or similar to the diameter of the elongate portion 164 or other lengths may be provided. In some examples, the lateral alignment spacer 180 may be in the form of a coupling 176 and may function to connect two corresponding sections 174 of the elongate portion 164 together in end-to-end fashion by having a threaded bore extending therethrough such that abutting ends of the two sections 174 may be threaded into the spacer 180 from each side. In other examples, the spacer 180 may sleevably engage the elongate portion 164 and be held in position with a set screw or other longitudinal position holding mechanism such as one or more retaining rings, for example. In one or more examples, the spacer 180 may be made from a non-marring material so as to protect and/or avoid damaging the inner surface of the cylinder 100. In one or more examples, the spacer 180 may be a polymer material such as rubber, plastic, nylon, or another material. Still other materials may be used that are softer than the cylinder wall material to avoid scratching or marring the inner surface. In one or more examples, the outer diameter of the spacer 180 may be adjustable to accommodate different cylinder sizes. The adjustable diameter may be provided by way of a diameter adjustment mechanism discussed in more detail below with respect to the delivery head 166 of the tool 162.

The proximal end of the tool 162 may include a strike block 168. The strike block 168 may be configured to provide a relatively large strike surface for striking the proximal end of the tool 162 to fully seat the sensor 110 in the pocket 148 at the distal end of the cylinder 100. As shown, the strike block 168 may be a relatively round bulbous element with a bullnose surface on its proximal face and relatively flat circular surface on its distal face. A bore may extend proximally into the distal surface to receive the elongate portion 164 and the proximal end of the elongate portion may bear against a bottom of the bore. The strike block 168 may have a diameter larger than the elongate portion 164 to provide a larger area for striking the tool 162 and to provide protection to a user's hand, which may be placed distally beyond the strike block 168. As shown, the strike block 168 may be secured to the proximal end of the elongate portion 164 via set screw that extends radially through strike block 168 and into the bore to engage the elongate portion 164. Alternatively, a threaded connection, an adhered connection, or another longitudinal position holding mechanism such as a retaining ring may be provided. While the strike block 168 has been described as a bulbous element, alternatively, the strike block may, more simply, include a closed end of the elongate portion 164, which may take the form of a plug or cap on the proximal end 172 of the elongate portion 164.

Figure 5:
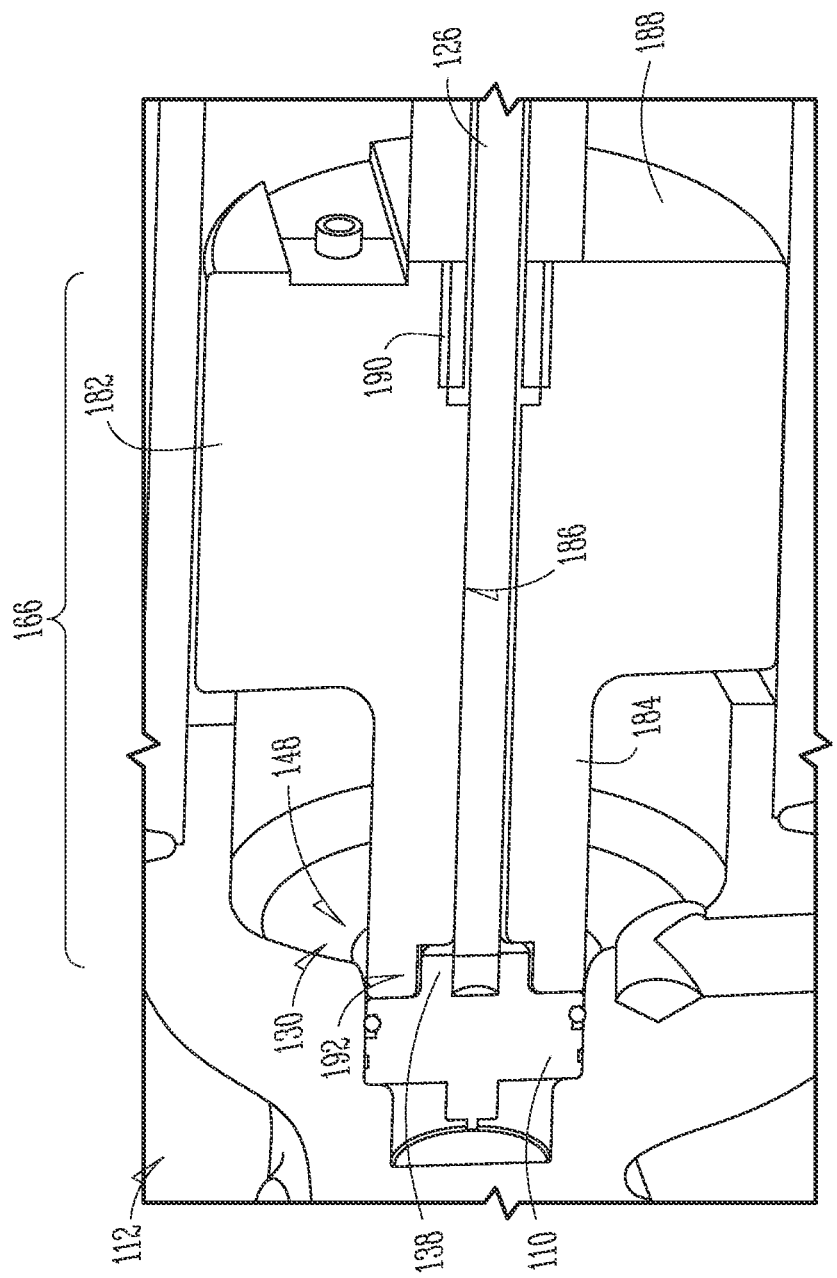
FIG. 5 is a close-up cross-sectional view of a delivery head in place within a hydraulic cylinder, according to one or more examples.

As shown in FIGS. 3-5, the delivery head 166 of the sensor installation tool 162 is shown arranged at a distal end 170 of the elongate portion 164. The delivery head 166 may be configured to hold the sensor 110 and maintain the sensor 110 in a centered position within the hydraulic cylinder 100 to align the sensor 110 with the pocket 148 in the cap end 112 of the cylinder. As shown, the delivery head 166 may include a centering portion 182 and a positioning portion 184.

The centering portion 182 may be configured to perform the centering function of the delivery head 166 and/or to maintain the alignment of the elongate portion 164 with the longitudinal axis of the hydraulic cylinder 100. The centering portion 182 may be a generally cylindrical element having an outer diameter that is the same or slightly smaller than the inner diameter of the hydraulic cylinder 100 to fit slidingly within the hydraulic cylinder 100. As shown, the centering portion 182 may have an inner bore 186 sized to receive the sensor pipe 126 where the inner bore 186 extends fully through the longitudinal length of the centering portion 182. At a proximal face 188 of the centering portion 182, a bore, socket, or other connection feature 190 may be provided for engaging the distal end 170 of the elongate portion 164. In one or more examples, the connection feature 190 may be a removable attachment mechanism such as a threaded connection or a set screw that provides for readily interchanging delivery heads 166 with differently sized centering portions 182. To be clear, removable attachment in this context includes connections that may involve the use of tools (e.g., wrenches, hex key wrenches, clamps, screw drivers, etc.), but excludes connections that would involve damaging, cutting, or otherwise modifying the elongate portion 164 or the delivery head 166 in order to remove and replace the delivery head 166. The centering portion 182 of the delivery head 166 may have a length selected to maintain the longitudinal alignment of the centering portion 182 and avoid skewing of the angle between the longitudinal axis of the centering portion 166 and the longitudinal axis of the cylinder 100. As shown, in one or more examples, the centering portion 182 may have a length the same, similar, slightly shorter, or slightly longer than the outer diameter of the centering portion 182. In other examples, longer or shorter lengths may be provided. While the centering portion 182 has been described as cylindrical shape, which may have circular cross-section, other shapes may be provided that have contact points with the inner surface of the cylinder to maintain the positioning portion at or near the center of the cylinder 100. For example, a square, star, triangle, octagon, plus-sign, or other cross-sectional shape may be provided. In these cases, the outer corners or tips of the shape may be arranged on a diameter that is the same or similar to the cylinder 100 shown.

The positioning portion 184 may extend from a distal face of the centering portion 182 and may be configured to perform the holding function as well as an offsetting function. As shown, the positioning portion 184 may include a generally cylindrical element extending distally from the distal face of the centering portion 182 and the positioning portion 184 may have an outer diameter or other outer cross-sectional dimension that is smaller than that of the centering portion 182. In one or more examples, the outer cross-sectional dimension may be the same, similar, or slightly smaller than an outer diameter of the sensor 110 being placed in the pocket 148. As shown in FIG. 5, the proximal face of the sensor 110 may be placed distally from an internal end surface 130 of the hydraulic cylinder 100 and, as such, a positioning portion 184 that has a smaller outer cross-sectional dimension than the sensor 110 may help to avoid having the positioning portion 184 hang up on the end surface 130 of the cylinder 100 before driving the sensor 110 into a fully seated position.

Like the centering portion 182, the positioning portion 184 may include a longitudinally extending bore 186 configured for receiving the sensor pipe 126. In addition, a socket 192 may be provided on a distal end of the positioning portion 184 to receive the collar 138 of the sensor 110. That is, as shown, the sensor 110 may include a collar 138 on a proximal face for securing and/or connecting the sensor pipe 126 to the sensor 110. The socket 192 on the positioning portion 184 may be adapted to receive the collar 138 in a relatively loose, but light frictional engagement such that the sensor 110 may remain seated in the socket 192 when the tool 162 is traversing the length of the cylinder 100. However, once the sensor 110 is seated in the pocket 148 of the cylinder cap 112, the o-ring or other seal 154 on the peripheral surface of the sensor 110 may engage the pocket 148 of the cylinder cap 112 more strongly than the engagement of the positioning portion 184 with the collar 138 such that the installation tool 100 may be removed without dislodging the sensor 110. In other examples, the wiring or other items extending from a distal face of the sensor 110 may be fished through openings in the cap 112 to hold the sensor 110 in place while the installation tool 162 is removed. As such, the engagement of the positioning portion 184 with the collar 138 of the sensor 110 may be the same or even slightly higher than the frictional engagement of the sensor 110 with the pocket 148 of the cylinder cap 112.

It is to be appreciated that the positioning portion 184 may be incorporated into the centering portion 182 by providing the described socket 192 on a distal face of the centering portion 182. Depending on the internal shape of the cap end 112 of the cylinder 100, such a design may be sufficient to fully seat the sensor 110 in the cap end 112 of the cylinder 100. For other internal shapes of cylinders 100, such as where a portion of the cap end 112 sleeves inside the cylinder wall as shown in FIG. 5, the extended positioning portion 184 may be more suitable.

Like the lateral alignment feature, the delivery head including the centering portion and/or the positioning portion may be constructed of a polymer material or another material may be used. In one or more examples, the material may be softer than the cylinder material to reduce the risk of marring, scratching, or otherwise damaging the internal surface of the hydraulic cylinder.

Turning now to FIGS. 6 and 7, a centering portion 182 of a delivery head 166 is shown having an adjustable outer diameter. As mentioned, the centering portion 182 of the delivery head 166 may be configured to maintain a centered position of the positioning portion 184 within the hydraulic cylinder 100. As mentioned, the centering portion 182 may be removably attached to the elongate portion 164 to allow for changing out the centering portion 182 for different sizes. Alternatively or additionally, the centering portion 182 may include an adjustable outer diameter. As shown, for example, the centering portion 182 may include a plurality of radially adjustable standoffs 194. The standoffs 194 may be arranged in a slot or groove extending through the peripheral surface of the centering portion 182 and radially inward into the centering portion 182. The standoffs 194 may be adjustable radially into and out of the groove so as to increase and/or decrease the outer diameter of the centering portion 182. In one or more examples, the standoffs 194 may include longitudinally extending bores (not shown) on an inner edge thereof to receive adjustment pins 196. That is, the adjustment pins 196 may be removed, the standoff 194 may be moved radially in or out of the centering portion 182 to a respective bore size marking and the bores in the standoffs 194 may be aligned with the bores extending longitudinally through the centering portion 182. The adjustment pin 196 may then be reinserted to secure the standoff 194 at the selected location to define a centering portion 182 with a corresponding outer diameter. As shown in FIG. 6, standoffs 194 may be fully extended for a cylinder diameter of 6 inches and may be fully retracted (FIG. 7) for a cylinder diameter of 4 inches, for example. Still other sizes and ranges of adjustability may be provided. Still further, while the adjustable diameter is shown with respect to the delivery head 166, the lateral alignment feature(s) 180 may also have an adjustable diameter. Still other aspects of the tool 162 may incorporate the adjustable outer diameter. Moreover, other approaches to providing an adjustable outer diameter may also be provided such as radially arranged threaded fasteners, for example. Still other approaches may be used.

INDUSTRIAL APPLICABILITY

In operation and use, the presently described sensor installation tool 162 may be helpful in easing the installation of sensors 110 in hydraulic cylinders 100. In particular, the tool 162 may provide for reaching from an open rod end 120 of the cylinder 100, through the cylinder 100, to a closed cap end 112 to provide for installing the sensor 110 in a pocket 148 on an inside surface of the cap end 112. Moreover, the tool 162 may help to align the sensor 110 with the pocket 148 as it approaches the pocket 148 such as by centering the sensor 110 in the cylinder 100. Aligning the sensor 110 with the pocket 148 as it approaches the pocket 148 may help to avoid damaging the sensor 110 as it is advanced into the pocket 148 and some force is applied to fully seat the sensor 110 in the pocket 148. Installers can rest assured that the sensor 110 is aligned when applying the seating force without having to spend time worrying about the alignment and/or taking measures to ensure alignment. Moreover, the tool 162 may be constructed of material that will avoid or reduce the chances of scratching, cutting, or otherwise marring an inside surface of the hydraulic cylinder 100.

Figure 8A:
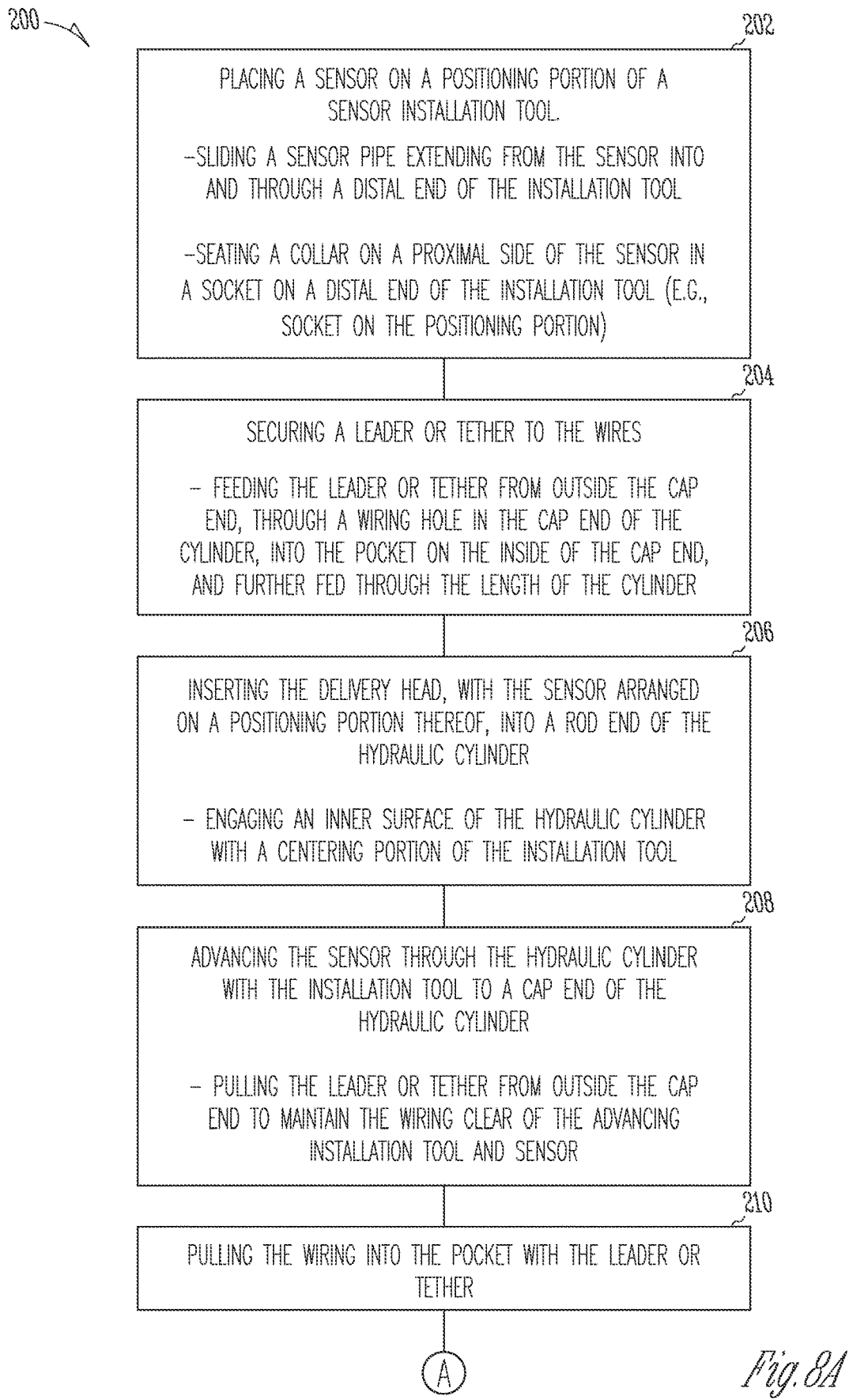
FIG. 8A is a diagram depicting a portion of a method of installing a sensor in a hydraulic cylinder, according to one or more examples.
Figure 8B:
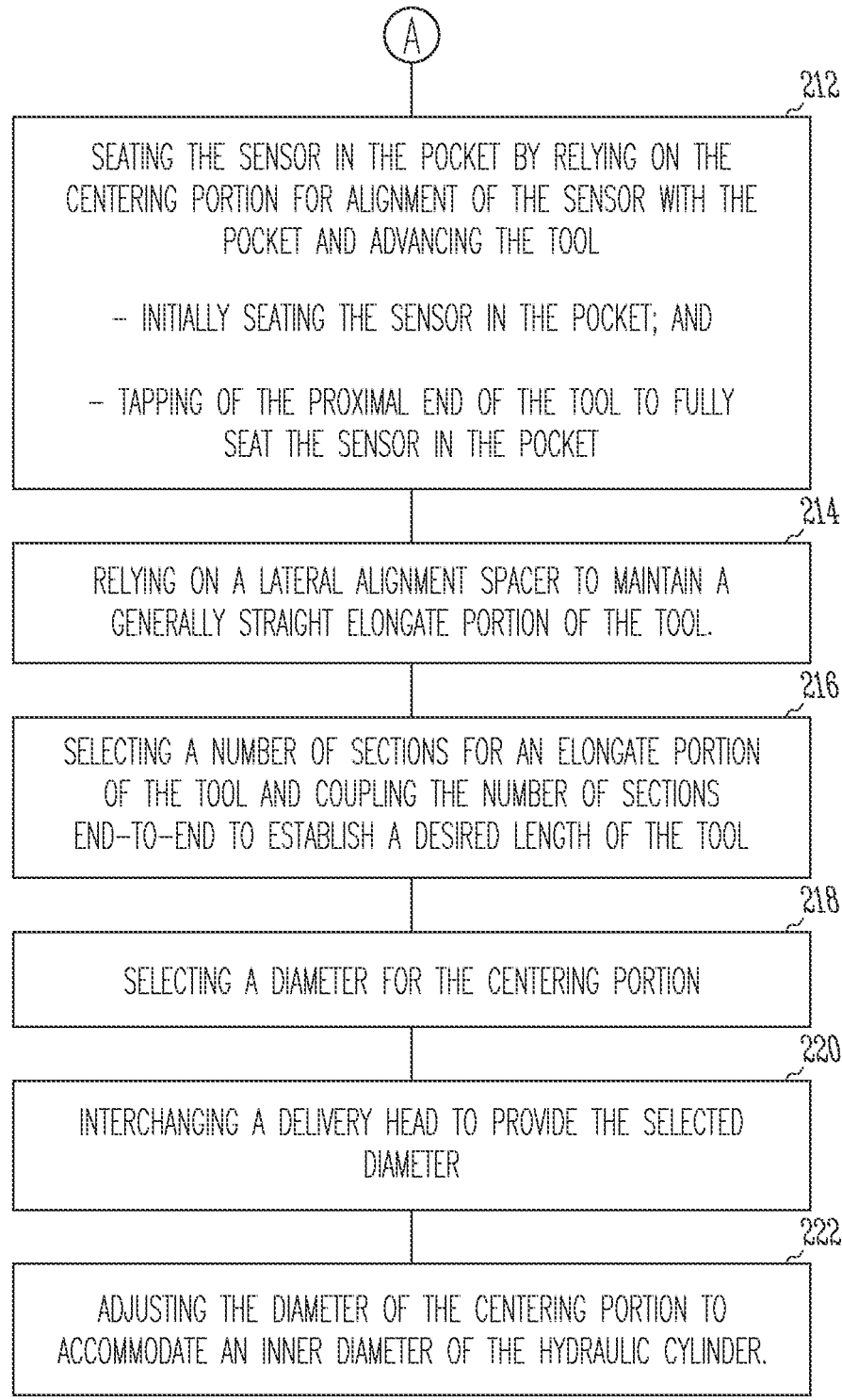
FIG. 8B is a diagram depicting another portion of a method of installing a sensor in a hydraulic cylinder, according to one or more examples.
Figure 9:
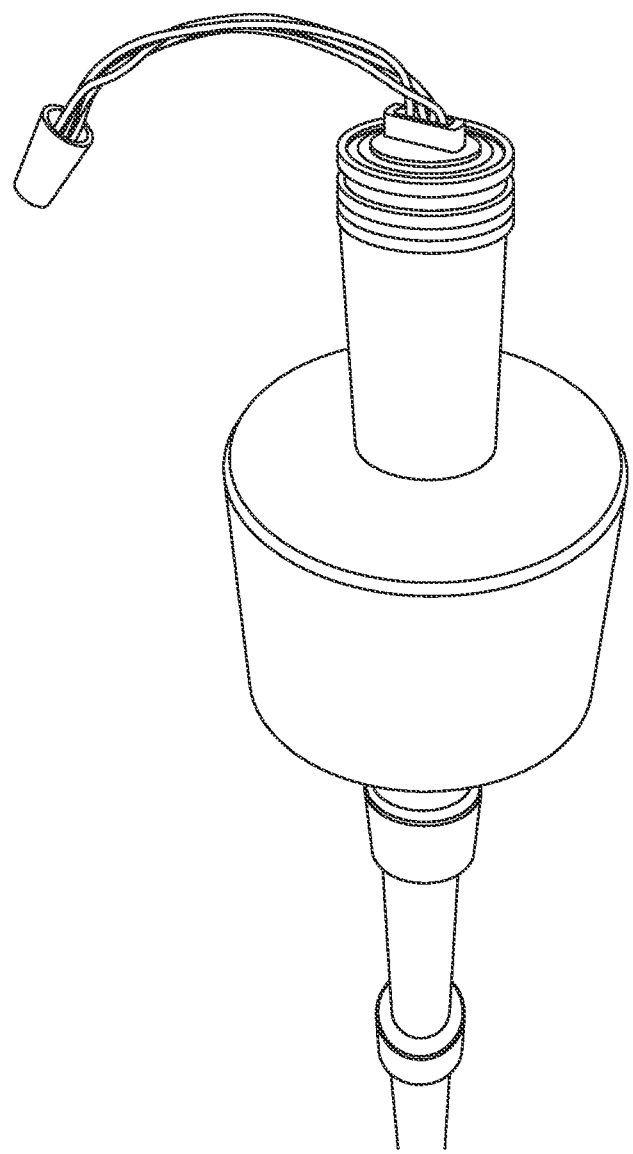
FIG. 9 is a perspective view of a sensor arranged on a distal end of an installation tool, according to one or more examples.
Figure 10:
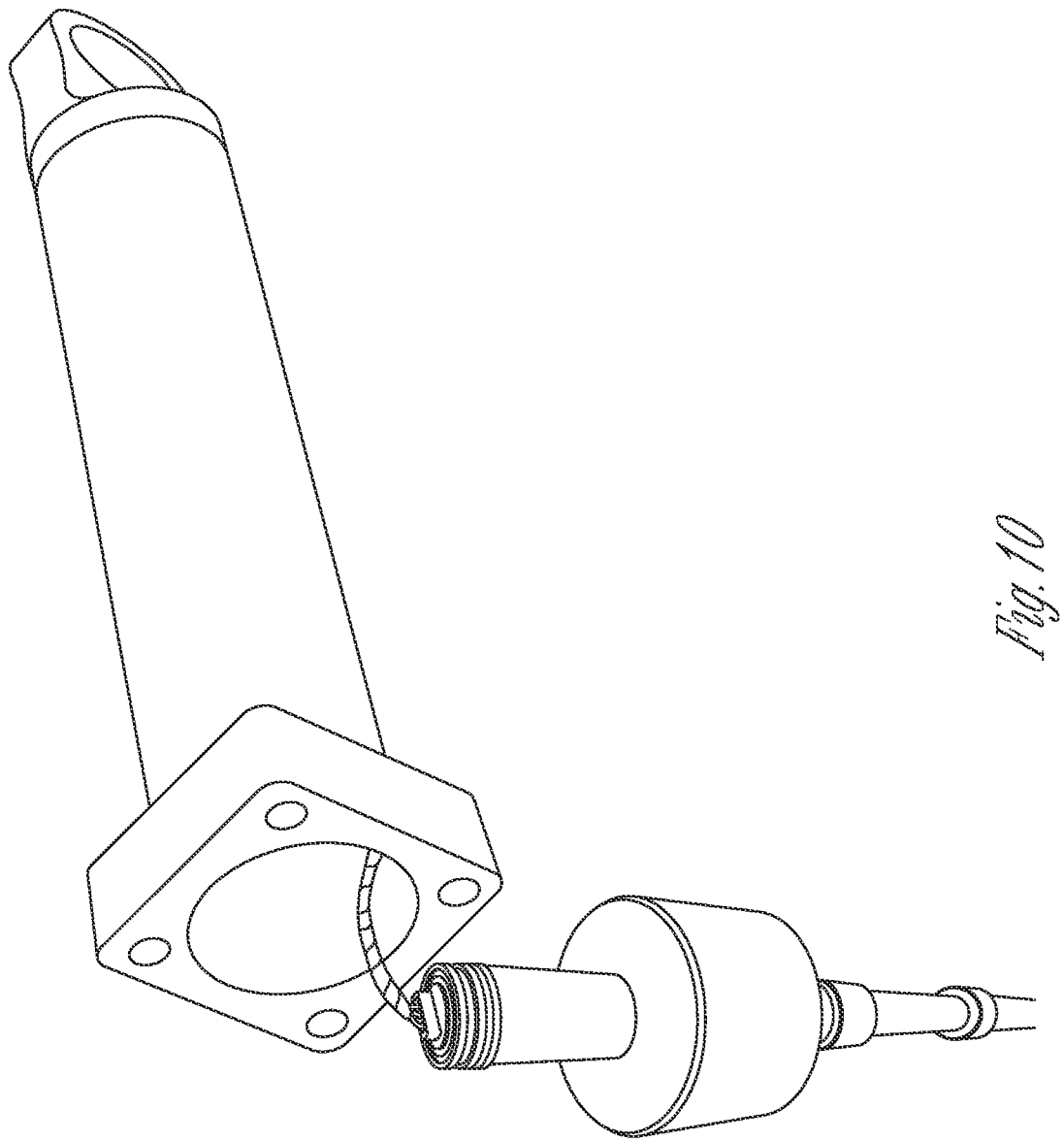
FIG. 10 is a perspective view of the sensor arranged on a distal end of the installation tool and having electrical cords taped off with a tether attached and fed through the cylinder, according to one or more examples.
Figure 11:
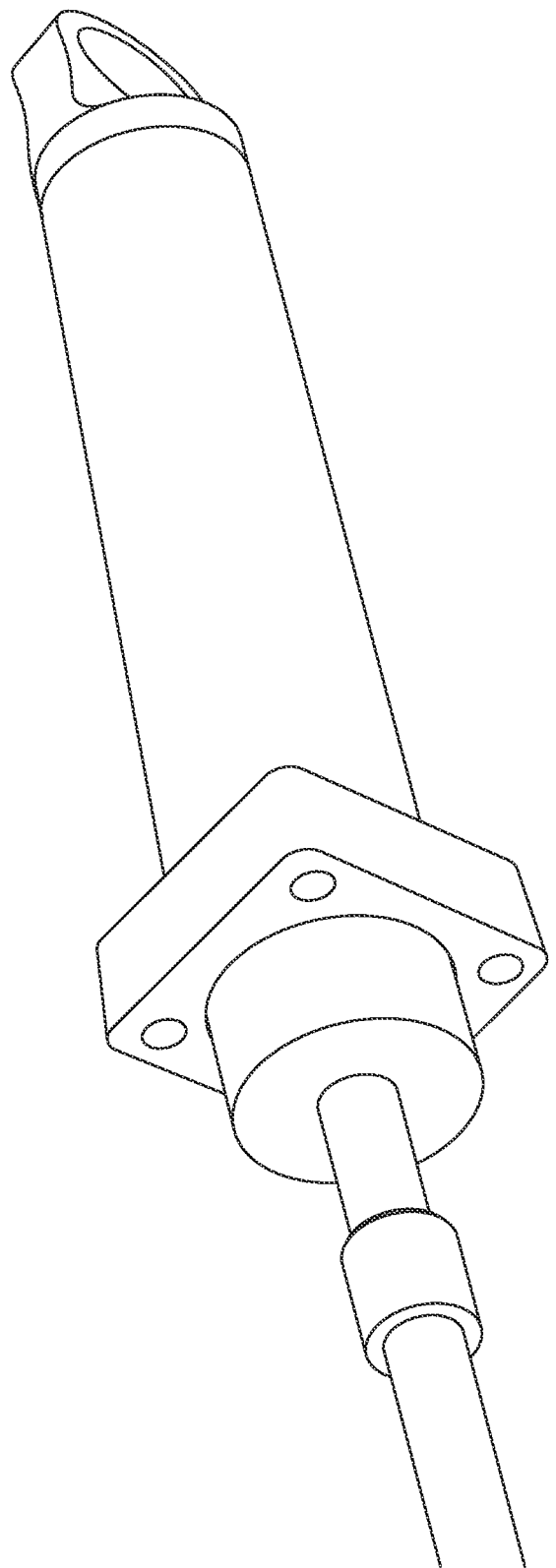
FIG. 11 is a perspective view of the installation tool being inserted into a rod end of a hydraulic cylinder.
Figure 12:
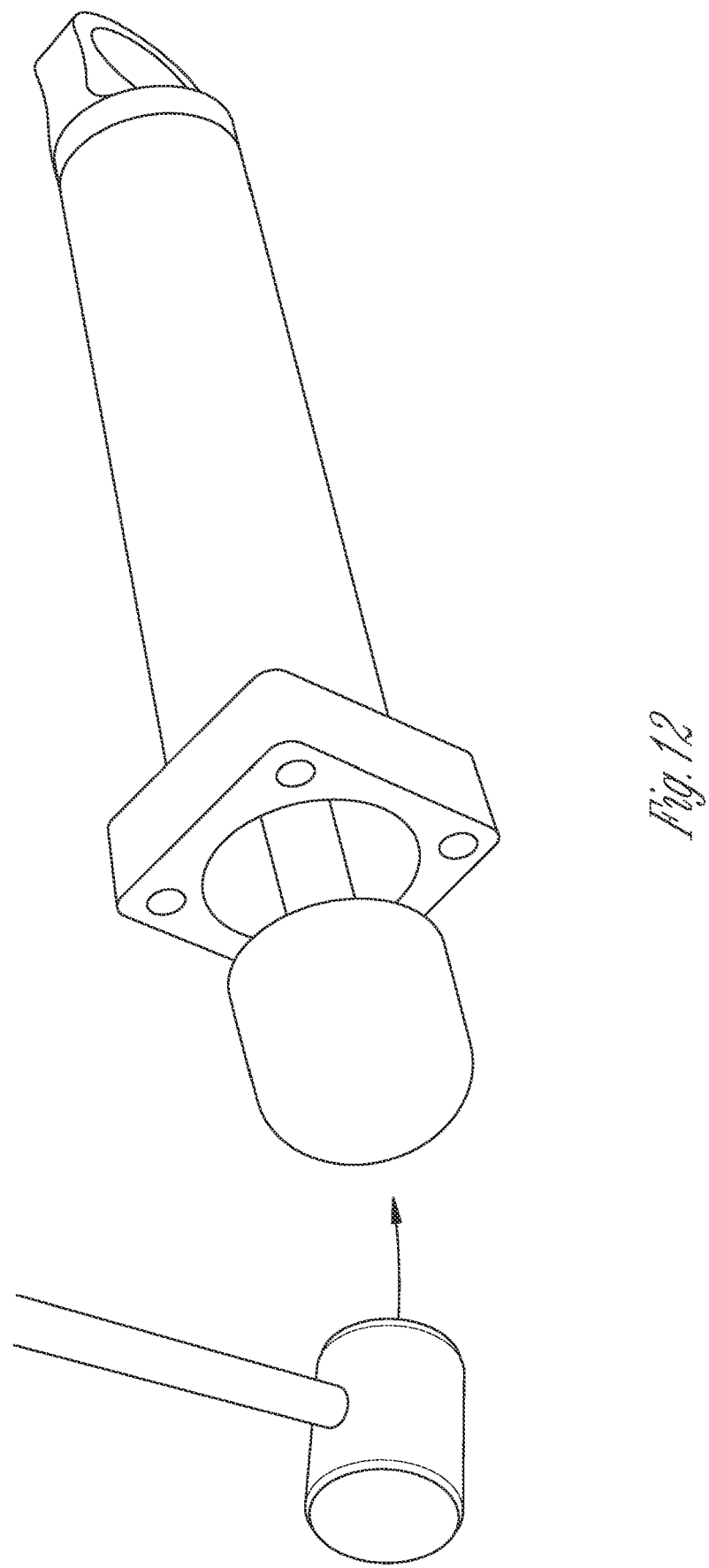
FIG. 12 is a perspective view of the installation tool inserted into the hydraulic cylinder and the strike block being used to fully seat the sensor in a pocket at the cap end of the cylinder, according to one or more examples.

Referring to FIGS. 8A and 8B, in one of more examples, a method 200 of installing a sensor 110 may be provided. In one or more examples, the method 200 may include installing the sensor 110 in a pocket 148 in a cap end 112 of a hydraulic cylinder 100. The method 200 may include placing 202 a sensor on a positioning portion of a sensor installation tool. As can be seen in FIG. 9, this may include sliding a sensor pipe extending from the sensor into and through a distal end of the installation tool and seating a collar on a proximal side of the sensor in a socket on a distal end of the installation tool (e.g., socket on the positioning portion). In one or more examples, wires may extend from a distal side of the sensor and a leader or tether may be secured 204 to the wires in anticipation of needing to pull and/or guide the wires into the pocket as the sensor approaches the pocket. In one or more examples, the leader or tether may be fed from outside the cap end 112, through a wiring hole in the cap end 112 of the cylinder, into the pocket 148 on the inside of the cap end 112, and further fed through the length of the cylinder before securing the leader or tether to the wires on the sensor. In this way, and as shown in FIG. 10, the leader or tether may be poised to pull and/or guide the wires of the sensor as the sensor is advanced into and through the cylinder. The method may also include inserting 206 the delivery head 166, with the sensor arranged on a positioning portion thereof, into an open rod end 120 of the hydraulic cylinder 100 as shown in FIG. 11. This may include engaging an inner surface of the hydraulic cylinder with a centering portion of the installation tool. The method may also include advancing 208 the sensor through the hydraulic cylinder with the installation tool to a cap end of the hydraulic cylinder. During this step, the leader or tether may be pulled from outside the cap end to maintain the wiring clear of the advancing installation tool and sensor. The method may also include pulling 210 the wiring into the pocket with the leader or tether. The method may also include seating 212 the sensor in the pocket by relying on the centering portion for alignment of the sensor with the pocket and advancing the tool. In one or more examples, and as shown in FIG. 12, seating the sensor in the pocket may include initially seating the sensor in the pocket and further tapping of the proximal end of the tool to fully seat the sensor in the pocket. For example, a rubber mallet or other tool may be used to tap or strike the strike block at the proximal end of the tool. In one or more examples, the method may also include relying 214 on a lateral alignment spacer to maintain a generally straight elongate portion of the tool. This may be helpful to ensure that tapping on the proximal end is effective to seat the sensor by avoiding or controlling buckling of the elongate portion of the tool during the tapping or striking of the proximal end of the tool. In one or more examples, the method may also include selecting 216 a number of sections for an elongate portion of the tool and coupling the number of sections end-to-end to establish a desired length of the tool. In still other examples, the method may include selecting 218 a diameter for the centering portion and either interchanging 220 a delivery head to provide the selected diameter or adjusting 222 the diameter of the centering portion to accommodate an inner diameter of the hydraulic cylinder.

The above detailed description is intended to be illustrative, and not restrictive. The scope of the disclosure should, therefore, be determined with references to the appended claims, along with the full scope of equivalents to which such claims are entitled.

What is claimed is:

1. A sensor installation tool for installing a sensor in a pocket in a cap end of a hydraulic cylinder, comprising:
an elongate portion configured for reaching through a hydraulic cylinder from outside a rod end to a cap end thereof and having a proximal end and a distal end;
a delivery head arranged on a distal end and comprising a centering portion and a positioning portion, the centering portion configured to engage an inner surface of the hydraulic cylinder to hold the positioning portion in a centered position within the cylinder and the positioning portion configured to hold the sensor at the centered position to align the sensor with the pocket and drive the sensor into the pocket; and
a lateral alignment spacer arranged between the distal end and the proximal end.

2. The sensor installation tool of claim 1, wherein the positioning portion has a diameter smaller than the centering portion and extends distally from the centering portion.

3. A sensor installation tool for installing a sensor in a pocket in a cap end of a hydraulic cylinder, comprising:
an elongate portion configured for reaching through a hydraulic cylinder from outside a rod end to a cap end thereof and having a proximal end and a distal end;
a delivery head arranged on a distal end and comprising a centering portion and a positioning portion, the centering portion configured to engage an inner surface of the hydraulic cylinder to hold the positioning portion in a centered position within the cylinder and the positioning portion configured to hold the sensor at the centered position to align the sensor with the pocket and drive the sensor into the pocket; and
a strike block at the proximal end configured to receive a longitudinal blow to drive the sensor into the pocket.

4. The tool of claim 1, wherein the elongate portion comprises a plurality of sections.

5. The tool of claim 4, wherein a number of the plurality of sections may be selected to adjust a length of the tool.

6. The tool of claim 4, wherein the plurality of sections are connected end-to-end with couplings.

7. The tool of claim 1, wherein the elongate portion comprises a plurality of sections and the lateral alignment spacer is a coupling for connecting two of the plurality of sections end-to-end.

8. The tool of claim 1, wherein the centering portion has an outer diameter adapted to engage the inner surface of the hydraulic cylinder.

9. The tool of claim 8, wherein the outer diameter is adjustable.

10. The tool of claim 8, wherein the delivery head is removably coupled to the distal end of the elongate portion to provide it as an interchangeable part.

11. A sensor installation tool for installing a sensor in a pocket in a cap end of a hydraulic cylinder, comprising:

an elongate portion configured for reaching through a hydraulic cylinder from outside a rod end to a cap end thereof and having a proximal end and a distal end;

a delivery head arranged on a distal end and comprising a centering portion and a positioning portion, the centering portion configured to engage an inner surface of the hydraulic cylinder to hold the positioning portion in a centered position within the cylinder and the positioning portion configured to hold the sensor at the centered position to align the sensor with the pocket and drive the sensor into the pocket; and wherein the delivery head and a length of the elongate portion are hollow to accommodate a sensing pipe on the sensor.

12. The tool of claim 1, wherein the positioning portion of the delivery head comprises a recess for seating engagement of a portion of the sensor.

13. The tool of claim 12, wherein the seating engagement is configured for a friction fit with the portion of the sensor.

14. A method of installing a sensor in a pocket in a cap end of a hydraulic cylinder, the method comprising:

assembling a sensor installation tool by selecting a number of sections for an elongate portion of the tool and coupling the number of sections end-to-end to establish a desired length of the tool;

placing a sensor on a positioning portion of the tool;

inserting the positioning portion with the sensor into a rod end of the hydraulic cylinder including engaging an inner surface of the hydraulic cylinder with a centering portion of the tool;

advancing the sensor through the hydraulic cylinder with the tool to a cap end of the hydraulic cylinder;

seating the sensor in the pocket by relying on the centering portion for alignment of the sensor with the pocket and advancing the tool.

15. The method of installing of claim 14, wherein seating comprises initially seating the sensor in the pocket followed by tapping of the proximal end of the tool to fully seat the sensor in the pocket.

16. The method of installing of claim 15, wherein tapping of the proximal end of the tool comprises tapping a strike block arranged on a proximal end of the tool.

17. The method of installing of claim 14, further comprising relying on a lateral alignment spacer to maintain a generally straight elongate portion of the tool.

18. The method of installing of claim 14, further comprising selecting a diameter for the centering portion and adjusting the diameter of the centering portion to accommodate an inner diameter of the hydraulic cylinder.

19. The tool of claim 1, wherein the lateral alignment spacer has an outer diameter selected to loosely engage an inside surface of the hydraulic cylinder.

* * * * *